United States Patent
Loh

(10) Patent No.: US 10,417,057 B2
(45) Date of Patent: Sep. 17, 2019

(54) MUTEX PROFILING BASED ON WAITING ANALYTICS

(71) Applicant: Oracle International Corporation, Redwood Shores, CA (US)

(72) Inventor: Eugene Ying Loh, Pacific Grove, CA (US)

(73) Assignee: Oracle International Corporation, Redwood Shores, CA (US)

(\*) Notice: Subject to any disclaimer, the term of this patent is extended or adjusted under 35 U.S.C. 154(b) by 185 days.

(21) Appl. No.: 15/419,699

(22) Filed: Jan. 30, 2017

(65) Prior Publication Data

US 2018/0217878 A1 Aug. 2, 2018

(51) Int. Cl.
*G06F 9/52* (2006.01)

(52) U.S. Cl.
CPC .................... *G06F 9/526* (2013.01)

(58) Field of Classification Search
CPC ....................................................... G06F 9/526
See application file for complete search history.

(56) References Cited

U.S. PATENT DOCUMENTS

| 7,765,547 | B2 | 7/2010 | Cismas et al. | |
|---|---|---|---|---|
| 8,392,930 | B2 | 3/2013 | Goldin | |
| 8,656,399 | B2 | 2/2014 | Krauss | |
| 2005/0080963 | A1* | 4/2005 | Schopp | G06F 9/526 |
| | | | | 710/200 |
| 2006/0036756 | A1* | 2/2006 | Driemeyer | G06T 15/005 |
| | | | | 709/231 |
| 2007/0168976 | A1* | 7/2007 | Klein | G06F 11/3612 |
| | | | | 717/124 |
| 2008/0163174 | A1 | 7/2008 | Krauss | |
| 2009/0144746 | A1* | 6/2009 | Song | G06F 9/4818 |
| | | | | 718/105 |
| 2009/0328041 | A1* | 12/2009 | Sudzilouski | G06F 9/526 |
| | | | | 718/100 |
| 2010/0011360 | A1* | 1/2010 | Fontenot | G06F 9/526 |
| | | | | 718/100 |

(Continued)

OTHER PUBLICATIONS

Tallent et al, Analyzing Lock Contention in Multithreaded Applications, ACM SIGPLAN Notices 45(5):269-280—May 2010.

(Continued)

*Primary Examiner* — Meng Ai T An
*Assistant Examiner* — Jorge A Chu Joy-Davila
(74) *Attorney, Agent, or Firm* — Invoke

(57) ABSTRACT

Techniques are described herein for profiling mutual exclusion locks. In one or more embodiments, a performance profiler identifies a first thread executing an activity within a parallel processing environment. The performance profiler identifies a set of one or more mutual-exclusion locks held by the first thread while the activity is being executed and determines the total number of threads waiting for at least one of the set of mutual-exclusion locks held by the first thread. The performance profiler then determines a total cost associated with execution of the activity based at least on the total number of threads waiting for at least one of the set of mutual-exclusion locks held by the first thread during execution of the activity. In one or more embodiments, the total cost is obtained by multiplying a raw cost with the number of threads waiting.

19 Claims, 7 Drawing Sheets

(56) References Cited

U.S. PATENT DOCUMENTS

| | | | |
|---|---|---|---|
| 2011/0113406 A1* | 5/2011 | Flemming | G06F 11/3404 717/128 |
| 2012/0158684 A1* | 6/2012 | Lowenstein | G06F 9/526 707/704 |
| 2012/0265968 A1* | 10/2012 | Sweeney | G06F 9/30 712/219 |
| 2016/0170438 A1* | 6/2016 | Wu | G06F 9/30065 713/400 |
| 2017/0039094 A1* | 2/2017 | Dice | G06F 9/526 |

OTHER PUBLICATIONS

Benoit Delbosc, Detecting Thread Contentions, Jul. 2011, .nuxeo. com/blog/detecting-threads-contention/.

* cited by examiner

200

| Mutex ID | Lock State | Lock Duration | Threads Waiting | Wait Time |
|---|---|---|---|---|
| Mutex A | X | 0.14 s | 5 | 0.12s |
| Mutex B | X | 0.15 s | 3 | 0.10 s |
| Mutex C | X | 0.12 s | 1 | 0.08 s |
| .... | ... | ... | ... | ... |

| Call Stack | Raw Cost | Total Cost |
|---|---|---|
| Call Stack A | 0.1 | 0.5 |
| Call Stack B | 0.2 | 0.4 |
| Call Stack C | 0.2 | 0.6 |
| …. | … | … |

FIG. 5

MUTEX PROFILING BASED ON WAITING ANALYTICS

TECHNICAL FIELD

The present disclosure relates, generally, to mutual exclusion locks. In particular, the present disclosure relates to managing and profiling mutual exclusion locks based on wait count analytics.

BACKGROUND

Parallel programming allows developers to devote multiple resources, such as central processing units (CPUs) and threads, concurrently to an application. Threads are often synchronized through mutual-exclusion locks (mutexes) to coordinate access to shared resources. For example, when a thread is attempting to write to a particular data object, a lock manager may require the thread to obtain a mutex before the thread is permitted to perform the write operation. The mutex on the data object prevents two or more threads from concurrently updating, deleting, and/or otherwise modifying a data object.

Parallel programming may boost performance linearly based on the degree of parallelism. For example, a set of operations that is split between four different processors may be executed up to four times as quickly compared to a single processor. Thus, the speed and responsiveness of complex applications may be significantly increased. However, in some cases, thread synchronization may slow performance and ultimately limit the degree of parallelism that may be successfully exploited. When performance fails to scale linearly, developers may face a difficult task in determining the underlying reasons.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of mutex monitors in accordance with one or more embodiments;

FIG. 5 illustrates an example set of performance profiles in accordance with one or more embodiments;

DETAILED DESCRIPTION

Figure 1:
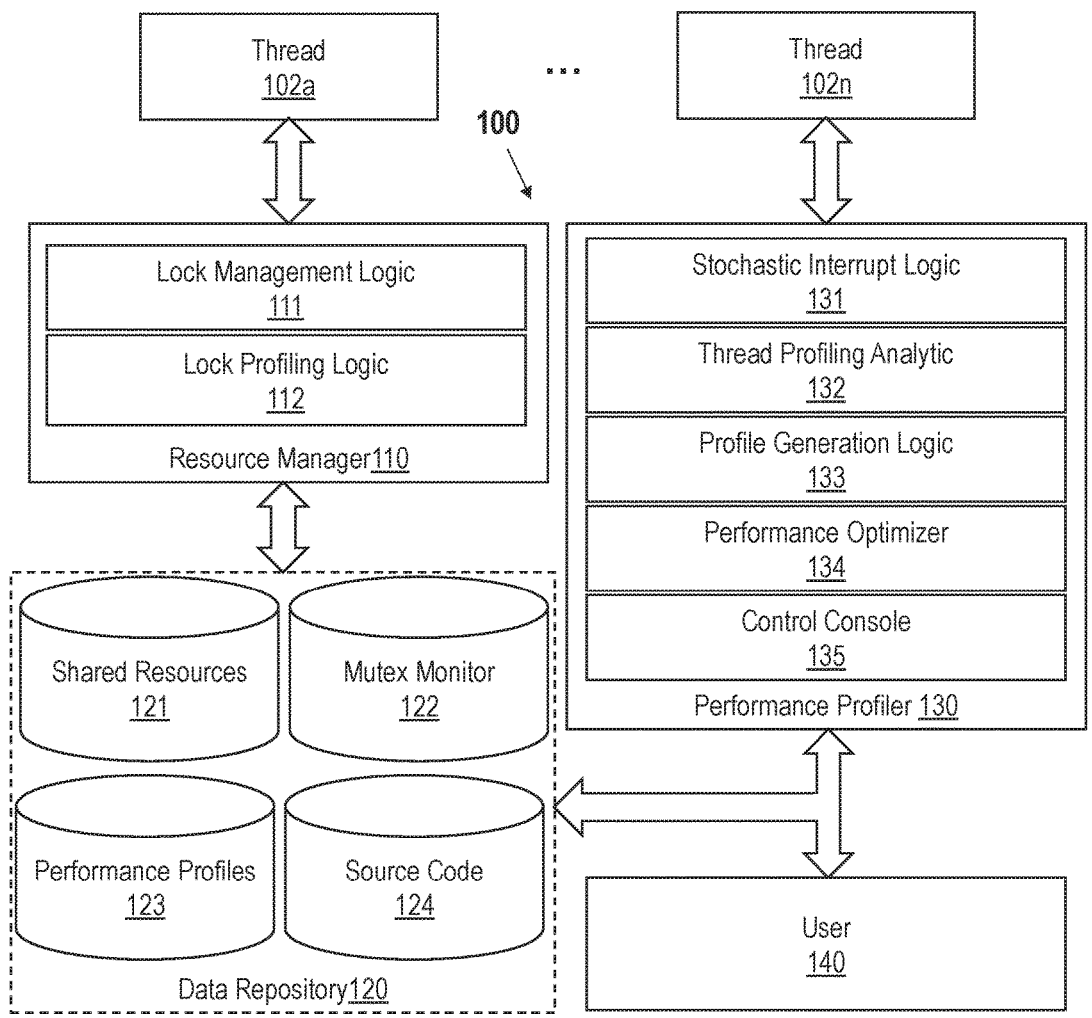
FIG. 1 illustrates a system for profiling mutexes in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. MUTEX PROFILING
4. THREAD ANALYTICS
5. PERFORMANCE OPTIMIZATIONS
6. HARDWARE OVERVIEW
7. MISCELLANEOUS; EXTENSIONS

1. General Overview

Contention for mutually-exclusive locks (mutexes) may impede the performance of parallel programs that share resources. When a thread acquires a mutex on a resource, other threads may be left waiting until the lock is released. As a result, lock contention may increase the number of idle threads, thereby reducing parallelism and parallel efficiency.

Lock contention may be reduced through various performance optimizations, depending on the underlying cause of the problem. Example optimizations include, but are not limited to, reducing or eliminating expensive calculations that are performed while locks are held, adjusting the granularity with which locks are granted, using thread-local storage rather than shared storage, reordering operations, and reducing unnecessary updates to shared resources. Performance optimizations that reduce lock contention may increase the degree of parallelism in a parallel program by limiting the overhead of thread synchronization caused by idling threads.

The source of lock contention may be difficult for developers to detect, especially in large-scale, complex applications. Developers may rely on performance profilers to help identify the source of problems and optimize parallel programs. In some approaches, a performance profiler may be configured to identify information about the threads that are waiting for a lock. Such approaches expose the symptoms of the problems caused by lock contention. However, such approaches provide information on the idle threads, which are the victims of the problem, rather than providing information about the threads that are causing the problem.

Techniques are described herein for identifying and profiling threads that are culprits of causing lock contention. In one or more embodiments, the performance profiler provides data about the state of a thread while the thread is holding a lock. The thread profiles may be used to pinpoint the activities and locks that are degrading performance. By focusing on the culprits instead of the victims of lock contention, the root cause of performance bottlenecks may be more effectively detected and addressed.

In one or more embodiments, a performance profiler is configured to identify a thread for profiling (herein referred to as a target thread). The performance profiler then determines the set of one or more mutexes held by the target thread while the target thread is executing its current activity. The performance profiler determines the total number of threads waiting for at least one of the set of mutexes held by the target thread during execution of the activity and, based at least in part on the total number of threads waiting for at least one of the set of mutexes, a total cost associated with execution of the activity. The total cost is a value or measure of the overall performance bottlenecks caused by the activity.

In one or more embodiments, a counter associated with a mutex is used to track the number of threads waiting and compute the total cost for an activity. The counter may be incremented in response to a thread attempting to acquire a mutex that is held by another thread. In this case, the thread enters an idle state, waiting for the lock to be released. When the thread acquires the mutex, the counter may be decremented. Thus, the counter tracks the total number of threads that are waiting on the mutex.

In one or more embodiments, threads are stochastically interrupted to acquire profile information. In response to being interrupted, the target thread records profile information including, but not limited to, the total number of threads waiting on mutexes currently held by the target thread. The total number of threads may be multiplied or otherwise combined with one or more additional thread metrics to compute a total cost for an activity executed by the thread.

In one or more embodiments, thread and/or activity profiles are generated based on the profile information recorded by one or more threads. For example, a performance profile for a target thread may identify the activity performed by the target thread, an indication of whether any other threads are waiting on locks held by the target thread, the total number of other threads that are waiting for mutexes held by the target thread, and a set of costs associated with executing the target thread. An activity profile may aggregate profile information from one or more threads that are executing the activity. Thus, the profile information may be used to determine the activities that are performed on the critical paths of parallel execution and which threads/activities are causing performance bottlenecks.

2. Architectural Overview

FIG. 1 illustrates system 100 for profiling mutexes in accordance with one or more embodiments. System 100 generally comprises threads 102*a-n*, resource manager 110, data repositories 120, performance profiler 130, and user 140. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Different components may be communicatively coupled via a direct connection and/or via a network connection. Different components may transmit messages and data to other components using one or more network communication protocols, such as communication protocols associated with the Internet Protocol (IP) Suite. In addition or alternatively, different components may transmit data using one or more communication protocols for passing messages between components executing on the same host machine, such as issuing function calls, issuing interrupts, and posting work requests in a queue.

Data repository 120 includes volatile and/or non-volatile storage for storing shared resources 121, mutex monitor 122, performance profiles 123, and source code 124. Data repository 120 may be implemented by any type of storage unit and/or device (e.g., a file system, database, collection of tables, disk, tape cartridge, random access memory, disk, or any other storage mechanism) for storing data. Further, data repository 120 may include multiple different storage units and/or devices. The multiple different storage units and/or devices may or may not be of the same type or located at the same physical site. Further, data repository 120 may be implemented or may execute on the same computing system as one or more other components of FIG. 1 and/or may reside remotely from one or more other components.

Threads 102*a-n* represent two or more threads that are executing activities within a parallel computing environment. A "thread" in this context refers to a unit of execution comprising a sequence of one or more instructions for carrying out a corresponding activity. An "activity" may correspond to a function, sub-function, computation, or any other subset of instructions from a parallel program. The parallel computing environment may execute threads in parallel on separate physical processors, such as separate CPUs, and/or within different cores of the same physical processor.

Resource manager 110 controls access to shared resources 121 by threads 102*a-n*. Shared resources 121 may include, but are not limited to data objects (e.g., files, database tables, arrays, trees, or any other content that may be addressed and interpreted by a thread). Resource manager 110 prevents multiple threads from concurrently updating, deleting, and/or otherwise modifying the same shared resource. Resource manager 110 generally comprises lock management logic 111 and lock profiling logic 112 to manage mutexes associated with shared resources 121. Lock management logic 111 processes requests to access shared resources, and lock profiling logic 112 processes requests to access lock profiles. Example operations for processing resource and lock profile requests are provided in further detail below.

Performance profiler 130 performs performance analysis on parallel programs that are executed within system 100. Performance profiler 130 generally comprises stochastic interrupt logic 131, thread profiling analytic 132, profile generation logic 133, performance optimizer 134, and control console 135. Components of performance profiler 130 may be used to generate performance profiles 123 and optimize source 124 according to techniques described in further detail below.

User 140 interacts with performance profiler 130 via control console 135. A "user" in this context may be a human user, such as a developer of a parallel program embodied in source code 124, or another application. Control console 135 may comprise a graphical user interface (GUI), an application programming interface (API), a command-line interface (CLI), and/or any other interface for receiving data from and providing data to user 140. User 140 may interact via control console 135 to perform a variety of functions including, but not limited to configuring settings, generating and viewing profiles, and perform optimizations of source code 124.

3. Mutex Profiling

In one or more embodiments, resource manager 110 maintains mutex monitor 122 to track metrics associated with the mutexes. As mutexes are granted to and reacquired from threads 102*a-n*, resource manager 110 updates metrics in a corresponding mutex monitor. For example, the mutex monitor may maintain a counter that is incremented each time one of threads 102*a-n* requests to acquire a mutex. When the thread manages to acquire the mutex, resource manager 110 may decrement the counter in the mutex monitor. Thus, the counter in the mutex monitor tracks the number of threads that are waiting on the associated mutex.

The metrics maintained in a mutex monitor may vary from implementation to implementation. Example metrics may include, but are not limited to:

A thread counter that tracks the number of threads that are waiting on the mutex;

A duration value that tracks how long a thread that currently has the mutex has held the mutex;

An average wait time value that tracks the average amount of time threads wait to acquire the mutex; and/or A maximum wait time value that tracks the longest time a thread has waited to acquire the mutex.

FIG. 2 illustrates an example set of mutex monitors in accordance with one or more embodiments. The mutex monitors are maintained in table 200, although other data structures may be used depending on the implementation. Table 200 maps mutex identifiers (IDs) to a set of attribute values, including the state of a lock, the duration the lock has been held, the number of threads waiting on the lock, and the average wait time for the lock. Table 200 may include additional metrics and/or omit one or more of the illustrated attributes depending on the particular implementation.

The lock state attribute of table 200 indicates whether a lock has been granted on the corresponding resource. For example, Mutexes A, B, and C have a lock state value "X" indicating that an exclusive lock has been granted.

The lock duration attribute in table 200 tracks how long a thread has been holding a mutex. In the example illustrated, a first thread has held Mutex A for 0.14 seconds, a second thread has held Mutex B for 0.15 seconds, and a third thread has held Mutex C for 0.12 seconds. The duration value may be reset to zero each time the corresponding mutex is released and/or a new thread acquires the mutex.

The threads waiting attribute in table 200 stores a count value that tracks how many threads are waiting for a mutex on a resource. In the example illustrated, five threads are waiting for Mutex A to be released, three threads are waiting for Mutex B, and one thread is waiting for a Mutex C. Lock management logic 111 may increment the count value each time a thread requests access to a mutex and decrement the count value each time a thread is granted the mutex per the operations described below.

The wait time attribute in table 200 tracks how long one or more threads have been waiting for a mutex. In one or more embodiments, the wait time represents an average across all threads that are waiting for a mutex. For example, the wait time of 0.1 seconds for Mutex B may be an average wait time for the three threads waiting. Additionally or alternatively, a maximum wait time may be stored that identifies the longest wait time among the threads waiting. Thus, the 0.1 second wait time may correspond to the wait time of thread waiting the longest for Mutex B.

Figure 3:
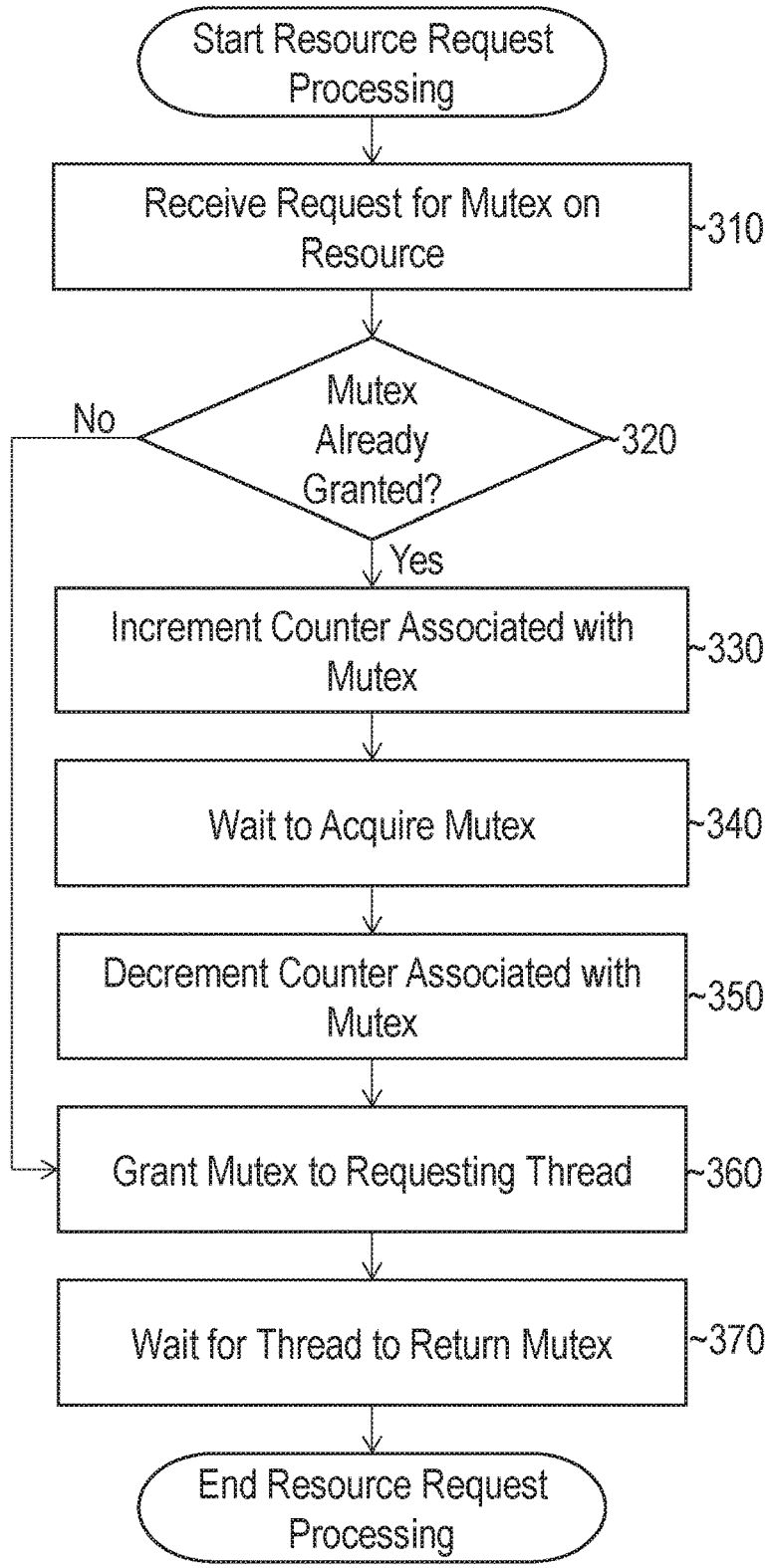
FIG. 3 illustrates an example set of operations for processing a request to access an object in accordance with one or more embodiments.

In one or more embodiments, lock management logic 111 processes lock requests from threads 102a-n. FIG. 3 illustrates an example set of operations for processing a request to access an object in accordance with one or more embodiments.

During runtime, lock management logic 111 receives a request for a mutex on a resource (Operation 310). For example, the request may request a mutex to perform a particular operation (e.g., a write, deletion, etc.) on one of shared resources 121. The request may identify a target resource to access using one or more resource identifiers, such as a resource name, address and/or offset.

In response to the request, lock management logic 111 determines whether a mutex has already been granted (Operation 320). For example, if a thread requests read or write access to a particular data object, access may be prevented due to a separate thread holding a mutex associated with the object.

If a conflicting mutex has already been granted for the resource, then lock management logic 111 increments a counter associated with the mutex (Operation 330). For example, lock management logic 111 may increment the threads waiting count value, as shown in table 200, in response to a thread attempting to access a resource locked by Mutex B or C. Lock management logic 111 may place the thread in a queue if there are other threads already waiting for the requested resource.

When a mutex is already held on the requested resource, the requesting thread enters a wait state to acquire the mutex (Operation 340). In one or more embodiments, lock profiling logic 112 monitors the wait time of the thread. For example, the thread may provide a timestamp, identifying a logical or physical time the request for the lock is initiated. A timestamp may be compared against current timestamp values within the system to determine the amount of time the thread has been waiting for the lock.

Once the mutex has been released, lock management logic 111 decrements the counter in the mutex monitors (Operation 350). Thus, the counter reflects a decrease in the total number of threads waiting for the mutex. This operation may be performed before or after grant of the mutex, depending on the particular implementation. Lock profiling logic 112 may also update the wait time statistics associated with the thread to indicate the total duration that the thread was waiting to acquire the mutex.

If a conflicting mutex has not been granted on the resource or a mutex has become available to the requesting thread, then lock management logic 111 grants the mutex to the requesting thread (Operation 360). Once granted, the requesting thread may perform one or more operations (e.g., update, insert, delete, etc.) on the corresponding resource.

After the mutex has been granted, lock management logic 111 waits for the thread to return the mutex (Operation 370). Typically, a thread returns a mutex after performing one or more operations on the resource.

4. Thread Analytics and Profiling

In one or more embodiments, performance profiler 130 performs analytics on threads to generate performance profiles 123. The thread analytics leverage the data stored in mutex monitor 122 to generate profiles of threads and activities that are causing lock contention and performance degradation. Performance profiles 130 may present performance profiles 123 to user 140, such as a developer, through control console 135. The presented profiles allow user 140 to quickly identify thread and activities within parallel programs that are culprits of lock contention.

In one or more embodiments, performance profiler 130 stochastically profiles threads 102a-n. With stochastic profiling, stochastic interrupt logic 131 periodically interrupts one or more of threads 102a-n to capture information about the state of each interrupted thread. Stochastic interrupt logic 131 may generate an interrupt signal on a regular time interval, which may occur by default or may begin in response to detecting a triggering event. Example triggering events may include, but are not limited to (a) receiving a command (e.g., from user 140) to start stochastic profiling and/or (b) detecting that performance of a resource (e.g., CPU utilization rates, memory utilization rates, etc.) has fallen below a threshold.

Figure 4:
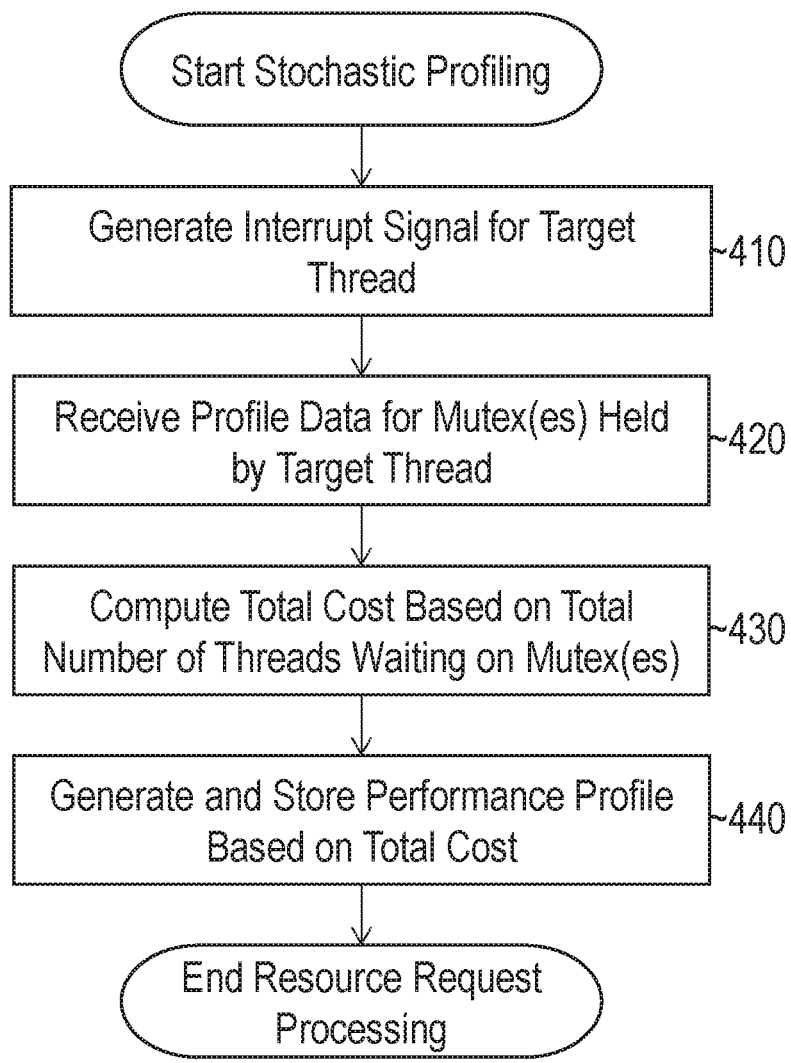
FIG. 4 illustrates an example set of operations for performing stochastic profiling on a thread in accordance with one or more embodiments.

FIG. 4 illustrates an example set of operations for performing stochastic profiling on a thread in accordance with one or more embodiments. Stochastic interrupt logic 131 initiates stochastic profiling by sending an interrupt signal to one or more of threads 102a-n (Operation 410). The interrupt signals may be generated periodically to capture the state of one or more threads at various time intervals.

When a target thread receives an interrupt signal, the thread temporarily halts the activity being currently executed. The target thread then obtains statistical data for all mutexes held by the target thread. To obtain mutex statistics, the target thread may submit a request to lock profiling logic 112. In response, lock profiling logic 112 may fetch the mutex statistics from data repository 120, which is returned to the thread and/or performance profiler 130.

Referring again to the set of operations depicted in FIG. 4, performance profiler 130 receives profile data for the mutexes held by the target thread (Operation 420). In one or more embodiments, the mutex monitors indicate the number of threads waiting on each lock held by the thread being profiled. For example, if the target thread has Mutex B, then performance profiler 130 may receive the corresponding mutex statistics in table 200 indicating that three threads are waiting for the mutex to be released.

In one or more embodiments, the number of threads waiting on a mutex does not need to be counted during runtime of the parallel program, but may be constructed as a function of time during postmortem analysis of performance profiling data if appropriate data was captured. For example, during runtime, resource manager 110 may record which mutex is acquired and released when and by which thread, what activities threads are engaged in as a function of time, and what locks a thread waits on (including from what time and to what time). In this example, the number of threads waiting may be determined without maintaining a runtime counter. Rather, performance profiler 130 may determine the number waiting based on the recorded thread activity.

In one or more embodiments, thread analytics may be configured to account for sharable locks, such as read-write locks, by maintaining for each such lock a second counter, to count holding threads. A thread would increment the counter when it acquires a lock and decrement the counter upon releasing the lock. When a target thread is interrupted, such an embodiment might not only multiply the raw cost by the number of threads waiting on a lock but also divide by the number of threads holding the lock.

In one or more embodiments, the profile data received by performance profiler may include a set of performance metrics indicating costs associated with the target thread. Example performance and cost metrics may include, but are not limited to, a CPU utilization rate during execution of the thread, cache hit and miss statistics (e.g., cache miss/hit counts and/or rates) associated with an activity, memory bandwidth statistics identifying the overall memory usage during thread execution, and the average latency in clock cycles for executing a thread.

In one or more embodiments, the profile data includes a stack sample associated with the target thread. A stack sample is a set of data from a call stack that identifies the subroutines the thread is currently executing and the functions that called the subroutines. Functions add data to the top of the stack when executed and remove the data from the stack after execution is finished. The stack sample may be used to identify the activity that is being executed by the thread.

In response to receiving the profile data, thread profiling analytic 132 computes a total cost for an activity based on the total number of threads waiting on mutexes held by the target thread executing the activity (Operation 430). In one or more embodiments, thread profiling analytic computes the total cost by multiplying the total cost with one or more cost metrics previously described. For example, thread profiling analytic 132 may compute the total cost as by multiplying a cost associated with a cache miss on the resource with the total number of threads waiting for the mutex on the resource. Thus, activities holding mutexes on resources that have a higher overall cache miss cost incur a higher total cost than activities holding mutexes on resources having lower overall cache miss costs if the same number of threads are waiting for mutexes held by threads executing the respective activities. In other examples, the total cost may be computed by multiplying, summing, averaging, and/or otherwise aggregating one or more other costs (e.g., wait times, utilization rates, lock duration, etc.). For instance, the total cost may be computed as by averaging the CPU and memory usage rates and multiplying by the number of threads waiting. Other computations may also be implemented and may vary depending on the particular implementation.

In one or more embodiments, the total cost may aggregate costs across multiple threads of execution. For example, a first thread executing a particular function/activity may have four threads waiting on a mutex held by the first thread. A second thread may subsequently execute the same function and have six threads waiting on the mutex, incurring a greater overall cost. A total cost for the activity may then be computed by aggregating (e.g., averaging or summing) the total cost of the first thread and the second thread.

Once thread profiling analytic 132 has computed a total cost, profile generation logic 133 generates a performance profile for the activity (Operation 440). In one or more embodiments, the performance profile maps the activity to the received profile data and the total cost that was computed. Performance profiles for multiple activities may be aggregated and presented in a report to allow user 140 to quickly identify activities that are incurring the highest total costs, which are computed as a function of the number of threads waiting for the activity to return a mutex.

FIG. 5 illustrates an example set of performance profiles in accordance with one or more embodiments. The performance profiles are maintained in table 500, although other data structures may be used depending on the implementation. Table 500 maps activities to a set of performance attributes including a raw cost and a total cost. Table 500 may include additional metrics and/or omit one or more of the illustrated attributes depending on the particular implementation. For example, table 500 may further map activities to the number of threads waiting for mutexes held, an average duration that the mutexes have been held, the average wait time for the lock and/or any other metrics associated with mutexes held by the activity. Additionally or alternatively, table 500 may map activities to CPU utilization rates, memory usage rates, cache miss counts and/or any other metrics obtained by stochastically profiling threads 102*a-n*.

Table 500 categorizes activities based on the stack samples received during thread profiling. For example, table 500 includes Call Stacks A, B, and C, representing different stack samples that were obtained responsive to a stochastic interrupt signal. In one or more embodiments, each call stack identifies the routine being executed by a thread when the interrupt is received and information about the routines caller (e.g., the return address to the routine's caller).

Table 500 further includes fields presenting the raw cost and total cost associated with each call stack. The raw cost may correspond to the total time it takes a thread to perform an activity. For example, the raw cost "0.1" of Call Stack A may indicate that a thread has spent 0.1 seconds executing the corresponding subroutine. The total cost may be obtained by multiplying the number of threads waiting by the raw cost. If five threads are waiting on the thread in Call Stack A, for instance, then a total cost of "0.5" may be assigned. The raw cost and/or total cost may be averaged or otherwise aggregated over multiple threads of execution as previously described, depending on the particular implementation. The user may navigate table 500 to identify which activities are causing the most number of threads to wait and have the highest overall total cost. In other words, the performance profiles may be used to quickly identify the threads that have the most significant impact on the degree of parallelism and parallel efficiency.

5. Performance Optimizations

Performance optimizer 134 and/or user 140 may leverage the performance profiles to perform one or more optimizations on a parallel program. For example, performance optimizer 134 and/or user 140 may identify the activities that are the primary culprits for lock contention. The set of instructions that correspond to the activity may be reorganized, rewritten, or otherwise updated to reduce the total cost of the activity.

Figure 6:
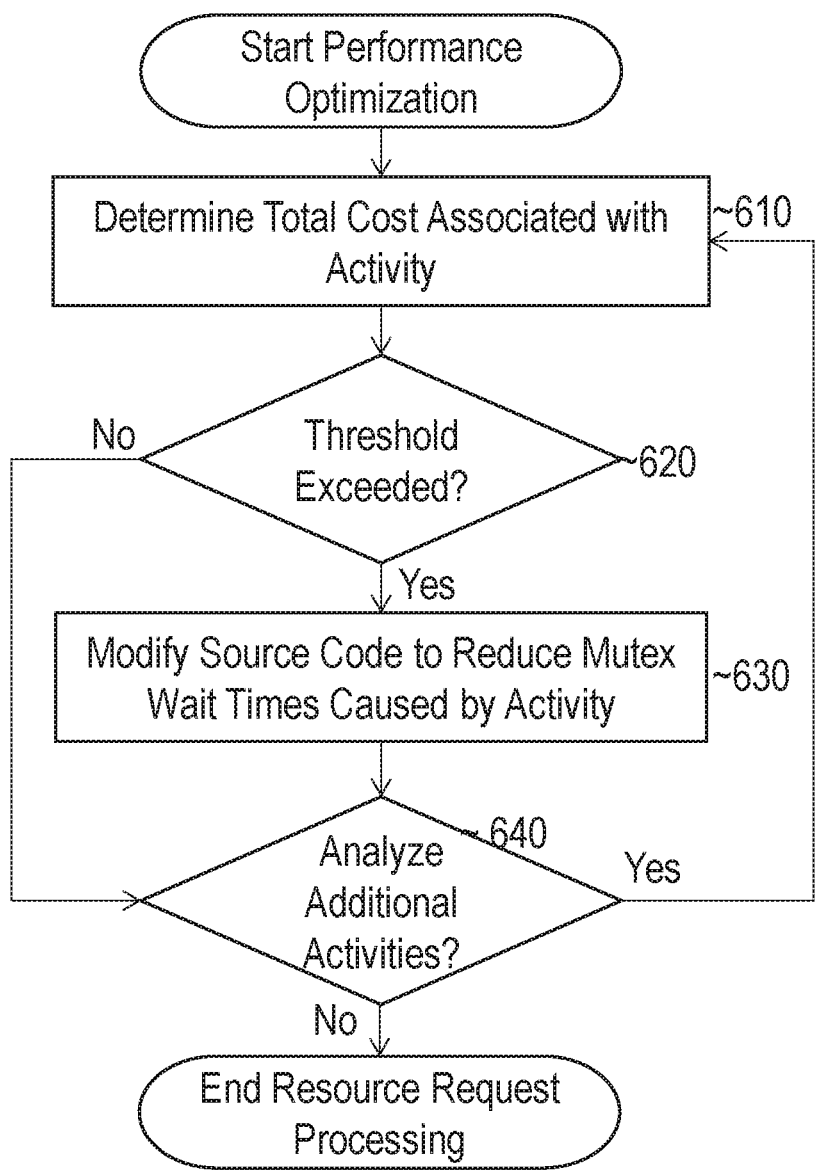
FIG. 6 illustrates an example set of operations for optimizing performance of an application based on mutex profiling, in accordance with one or more embodiments.

FIG. 6 illustrates an example set of operations for optimizing performance of an application based on mutex profiling, in accordance with one or more embodiments. Profile optimizer 134 analyzes performance profiles 123 to determine a total cost associated with one or more activities (Operation 610). For example, performance optimizer 134 may parse the performance profiles depicted in FIG. 5 to determine the total cost associated with various activities.

Once the total cost of an activity has been determined, performance optimizer 134 compares the total cost to a threshold to determine whether the threshold has been exceeded (Operation 620). The threshold may vary depending on the particular implementation. For example, the threshold may be predetermined, selected by user 140, or be computed based on the total cost relative to a total cost associated different activities in the parallel program (e.g., the top n most costly activities may be rewritten or activities having a total cost exceeding the average).

If the threshold is determined to be exceeded, then performance optimizer 134 modifies the source code associated with the activity to reduce mutex wait times cause by the activity (Operation 630). Example modifications are described in further detail below.

Once the source code has been optimized or if the total cost of the activity does not exceed the threshold, then performance optimizer 134 may determine whether to analyze additional activities in the parallel program (Operation 640). The process may thus be repeated for two or more activities such that multiple modification and performance optimizations may be made to the underlying source code.

As noted above, the performance optimization includes one or more changes to source code 124 of the parallel program to reduce lock contention. In one or more embodiments, performance optimizer 134 or user 140 may modify source code 124 to reduce expensive calculation that are performed while locks are held. For example, an activity may involve a thread acquiring a lock on a resource, performing an expensive calculation in which the lock is not needed, and subsequently releasing the lock. In this scenario, the order of operations may be reorganized such that the calculation is performed before the lock has been acquired or after the lock has been released.

In one or more embodiments, the source code for an activity may be modified to leverage thread-local storage rather than shared storage. For example, a counter variable that tracks loop iterations may not need to be a global, shared variable. Rather, the counter may be maintained locally such that the thread may update the counter without obtaining a lock.

In one or more embodiments, the granularity of the locks may be adjusted for an activity. Rather than acquiring a lock on an entire table, for instance, the thread may be granted a row-level lock to perform an update operation. In the context of an array, the thread may be granted a lock on an individual element of the array rather than the entire array. With finer-level locks, other threads are not held up waiting to update different rows or other elements of the same data structure.

Performance optimizer 134 and/or user 140 may perform any one or more of the modifications provided above. In addition or alternatively, other modification may also be performed to reduce lock contention caused by an activity having a total cost exceeding a threshold. Other examples include, but are not limited to adjusting the type of lock that is granted to a thread (e.g., changing an exclusive lock to a shared lock or a read-only lock) and eliminating variables that have become hotspots (e.g., removing an unnecessary variable that tracks the size of a list that is updated each time a thread adds or deletes an element from the list). Thus, the number and types of optimizations that are performed for a given activity may vary from implementation to implementation.

6. Hardware Overview

According to one or more embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
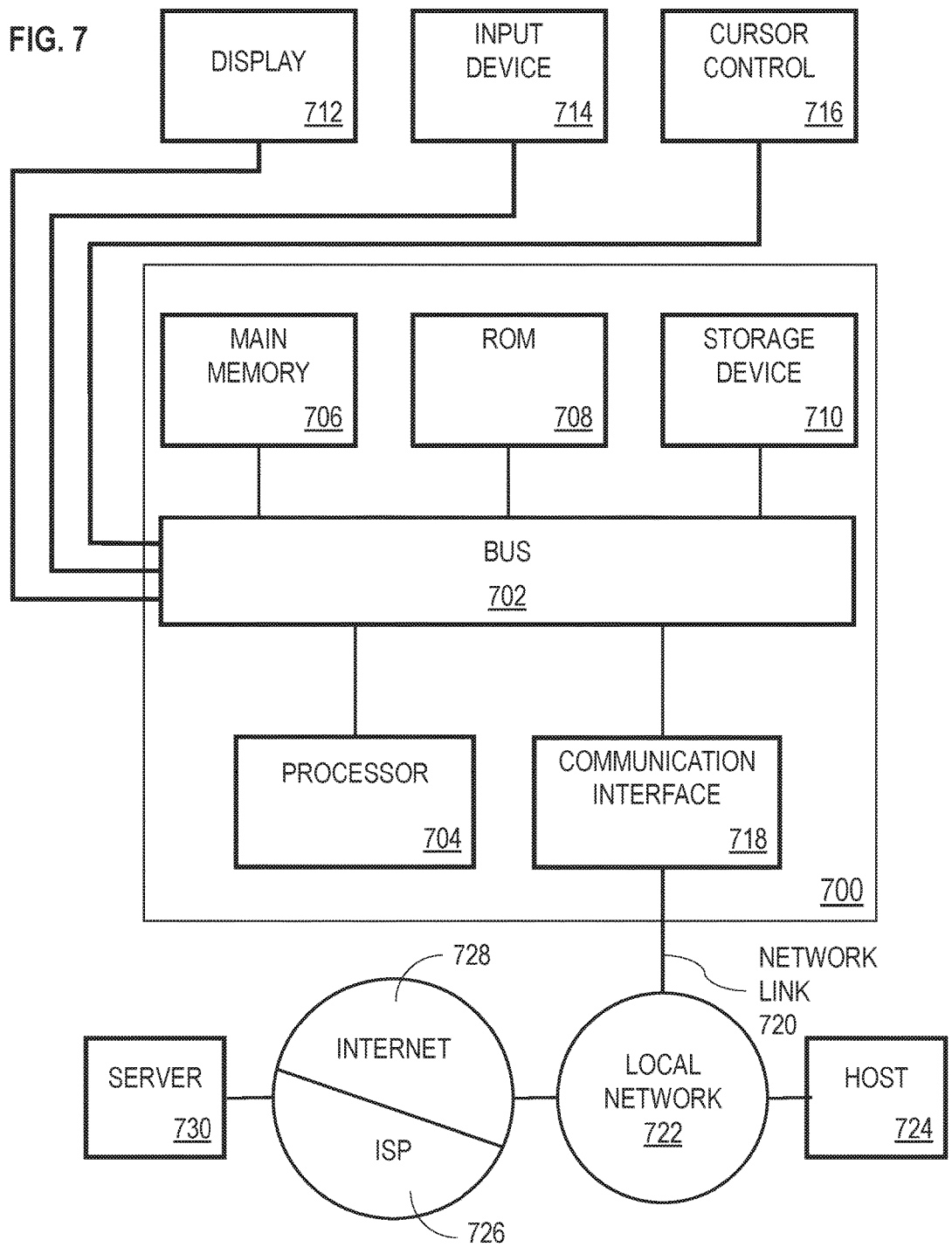
FIG. 7 illustrates an example computer system upon which one or more embodiments may be implemented.

For example, FIG. 7 is a block diagram that illustrates computer system 700 upon which one or more embodiments may be implemented. Computer system 700 includes bus 702 or other communication mechanism for communicating information, and hardware processor 704 coupled with bus 702 for processing information. Hardware processor 704 may be, for example, a general purpose microprocessor.

Computer system 700 also includes main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT), liquid crystal display (LCD), or light-emitting diode (LED), for displaying information to a computer user. Input device 714, which may include physical and/or touchscreen based alphanumeric keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to host computer 724 or to data equipment operated by Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable medium comprising instructions which, when executed by one or more hardware processors, causes performance of operations comprising:

identifying a first thread executing an activity;

determining a set of one or more mutual-exclusion locks held by the first thread while the activity is being executed;

determining a total number of threads waiting for at least one of the set of one or more mutual-exclusion locks held by the first thread during execution of the activity;

stochastically interrupting the first thread executing the activity to determine a set of one or more values representing costs associated with executing the activity;

generating a profile for the activity based at least in part on the set of one or more values representing costs associated with executing the activity;

determining a total cost associated with execution of the activity as a function of at least the set of one or more values representing at least one cost associated with the first thread executing the activity and the total number of threads waiting for at least one of the set of one or more mutual-exclusion locks held by the first thread during execution of the activity; and implementing, based at least in part on the total cost associated with execution of the activity, a performance optimization by modifying code for executing the activity to reduce mutex wait times caused by execution of the activity.

2. The non-transitory computer-readable medium of claim 1, wherein determining the total cost associated with execution of the activity comprises:

multiplying a value of the one or more values representing a raw cost associated with execution of the activity by the total number of threads waiting for at least one of the set of one or more mutual-exclusion locks.

3. The non-transitory computer-readable medium of claim 1, wherein determining the total cost associated with execution of the activity comprises:

multiplying a value of the one or more values representing a period of time for completing execution of the activity by the total number of threads waiting for at least one of the set of one or more mutual-exclusion locks.

4. The non-transitory computer-readable medium of claim 1, wherein determining the total cost associated with execution of the activity comprises:

multiplying a value of the one or more values representing a cost associated with a cache miss with a total number of threads waiting for at least one of the set of one or more mutual-exclusion locks held by the first thread during execution of the activity.

5. The non-transitory computer-readable medium of claim 1, wherein the operations further comprise:

incrementing a counter associated with a particular mutual-exclusion lock of the set of one or more mutual-exclusion locks in response to a particular thread waiting for the particular mutual-exclusion lock, wherein the counter identifies a number of threads currently waiting for the particular mutual-exclusion lock;

decrementing the counter in response to the particular thread obtaining the mutual-exclusion lock.

6. The non-transitory computer-readable medium of claim 1, wherein implementing the performance optimization comprises modifying the code to defer execution of a calculation until after release of at least one of the set of one or more mutual-exclusion locks or perform execution of the calculation before acquiring at least one of the set of one or more mutual-exclusion locks.

7. The non-transitory computer-readable medium of claim 1, wherein implementing the performance optimization comprises modifying a granularity corresponding to at least one of the set of one or more mutual-exclusion locks.

8. The non-transitory computer-readable medium of claim 1, wherein implementing the performance optimization comprises modifying a global variable in the code to a local variable.

9. The non-transitory computer-readable medium of claim 1, wherein determining the total cost associated with execution of the activity is further based on a cost associated with execution of the activity by a second thread.

10. A method comprising:

identifying a first thread executing an activity;

determining a set of one or more mutual-exclusion locks held by the first thread while the activity is being executed;

determining a total number of threads waiting for at least one of the set of one or more mutual-exclusion locks held by the first thread during execution of the activity;

stochastically interrupting the first thread executing the activity to determine a set of one or more values representing costs associated with executing the activity;

generating a profile for the activity based at least in part on the set of one or more values representing costs associated with executing the activity;

determining a total cost associated with execution of the activity as a function of at least the set of one or more values representing at least one cost associated with the first thread executing the activity and the total number of threads waiting for at least one of the set of one or more mutual-exclusion locks held by the first thread during execution of the activity; and implementing, based at least in part on the total cost associated with execution of the activity, a performance optimization by modifying code for executing the activity to reduce mutex wait times caused by execution of the activity.

11. The method of claim 10, wherein determining the total cost associated with execution of the activity comprises:

multiplying a value of the one or more values representing a raw cost associated with execution of the activity by the total number of threads waiting for at least one of the set of one or more mutual-exclusion locks.

12. The method of claim 10, wherein determining the total cost associated with execution of the activity comprises:

multiplying a value of the one or more values representing a period of time for completing execution of the activity by the total number of threads waiting for at least one of the set of one or more mutual-exclusion locks.

13. The method of claim 10, wherein determining the total cost associated with execution of the activity comprises:

multiplying a value of the one or more values representing a cost associated with a cache miss with a total number of threads waiting for at least one of the set of one or more mutual-exclusion locks held by the first thread during execution of the activity.

14. The method of claim 10, further comprising:

incrementing a counter associated with a particular mutual-exclusion lock of the set of one or more mutual-exclusion locks in response to a particular thread waiting for the particular mutual-exclusion lock, wherein the counter identifies a number of threads currently waiting for the particular mutual-exclusion lock;

decrementing the counter in response to the particular thread obtaining the mutual-exclusion lock.

15. The method of claim 10, wherein implementing the performance optimization comprises modifying the code to defer execution of a calculation until after release of at least one of the set of one or more mutual-exclusion locks or perform execution of the calculation before acquiring at least one of the set of one or more mutual-exclusion locks.

16. The method of claim 10, wherein implementing the performance optimization comprises modifying a granularity corresponding to at least one of the set of one or more mutual-exclusion locks.

17. The method of claim 10, wherein implementing the performance optimization comprises modifying a global variable in the code to a local variable.

18. The method of claim 10, wherein determining the total cost associated with execution of the activity is further based on a cost associated with execution of the activity by a second thread.

19. A system comprising:
one or more hardware processors;
one or more non-transitory computer-readable media comprising instructions which, when executed by the one or more hardware processors, causes:
identifying a first thread executing an activity;
determining a set of one or more mutual-exclusion locks held by the first thread while the activity is being executed;
determining a total number of threads waiting for at least one of the set of one or more mutual-exclusion locks held by the first thread during execution of the activity;
stochastically interrupting the first thread executing the activity to determine a set of one or more values representing costs associated with executing the activity;
generating a profile for the activity based at least in part on the set of one or more values representing costs associated with executing the activity;
determining a total cost associated with execution of the activity as a function of at least the set of one or more values representing at least one cost associated with the first thread executing the activity and the total number of threads waiting for at least one of the set of one or more mutual-exclusion locks held by the first thread during execution of the activity; and
implementing, based at least in part on the total cost associated with execution of the activity, a performance optimization by modifying code for executing the activity to reduce mutex wait times caused by execution of the activity.

* * * * *